March 6, 1956 F. J. STRAUB 2,737,307
MECHANISM TO UNLOAD BLOCKS AND THE LIKE BY TILTING
Filed July 23, 1952 9 Sheets-Sheet 1

INVENTOR,
F. J. STRAUB,
ATTORNEY.

March 6, 1956 F. J. STRAUB 2,737,307
MECHANISM TO UNLOAD BLOCKS AND THE LIKE BY TILTING
Filed July 23, 1952 9 Sheets-Sheet 3
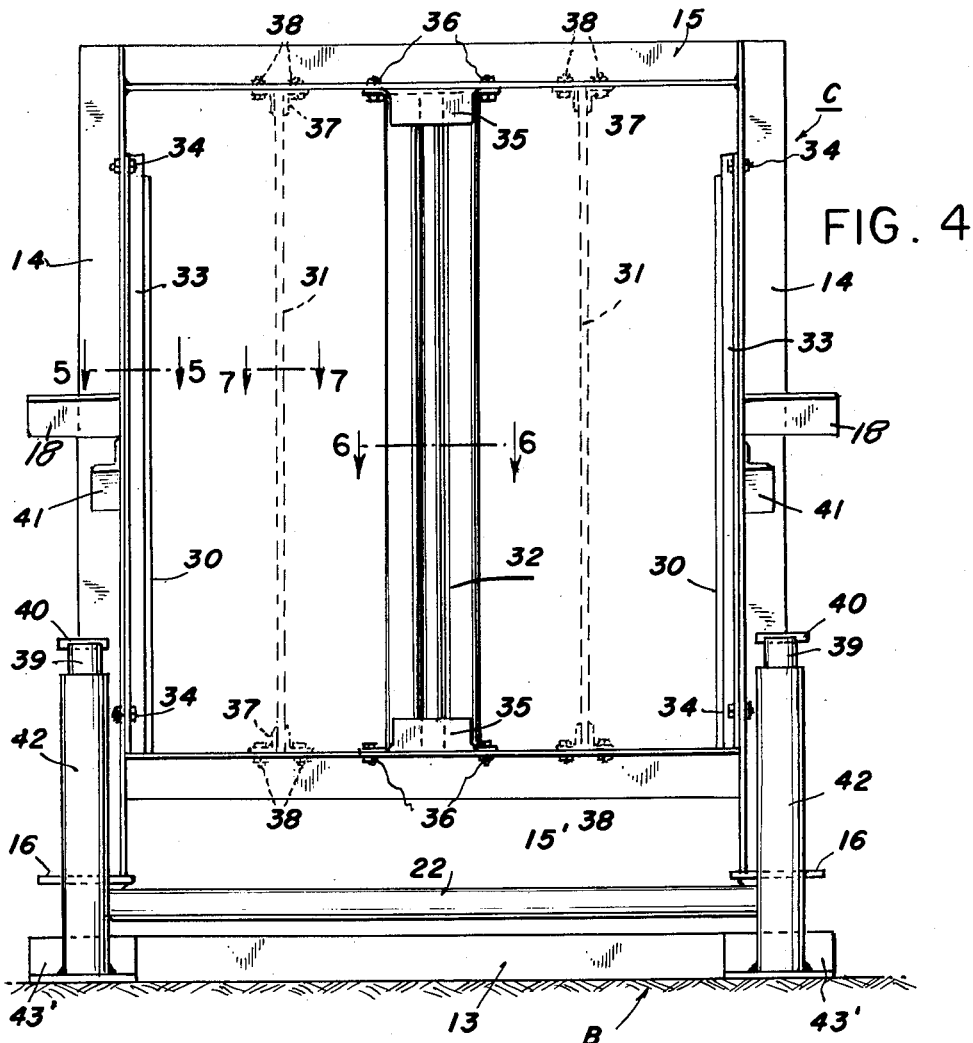
FIG. 4
FIG. 5
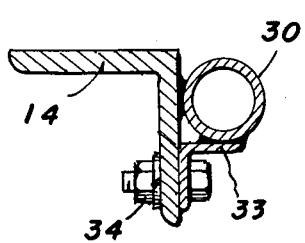
FIG. 6
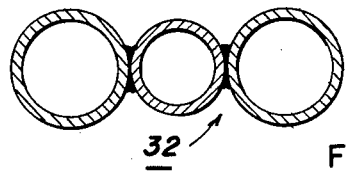
FIG. 7
INVENTOR,
F. J. STRAUB,
BY
ATTORNEY.

March 6, 1956 F. J. STRAUB 2,737,307
MECHANISM TO UNLOAD BLOCKS AND THE LIKE BY TILTING
Filed July 23, 1952 9 Sheets-Sheet 6

INVENTOR,
F. J. STRAUB,
BY
ATTORNEY

March 6, 1956 F. J. STRAUB 2,737,307
MECHANISM TO UNLOAD BLOCKS AND THE LIKE BY TILTING
Filed July 23, 1952 9 Sheets-Sheet 7
FIG. 11
FIG. 12
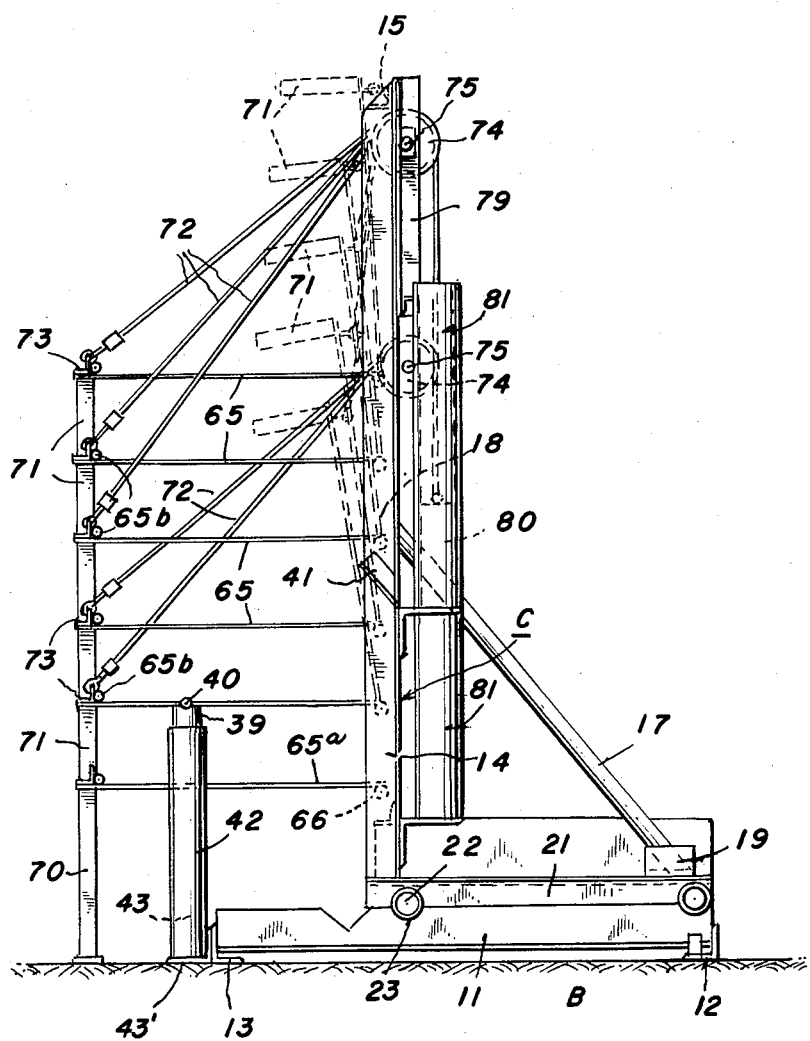
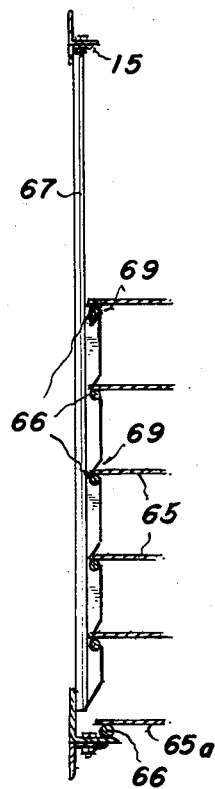
INVENTOR,
F. J. STRAUB,
BY
ATTORNEY, March 6, 1956   F. J. STRAUB   2,737,307
MECHANISM TO UNLOAD BLOCKS AND THE LIKE BY TILTING
Filed July 23, 1952   9 Sheets-Sheet 8

INVENTOR,
F. J. STRAUB,
BY
ATTORNEY,

March 6, 1956 F. J. STRAUB 2,737,307
MECHANISM TO UNLOAD BLOCKS AND THE LIKE BY TILTING
Filed July 23, 1952 9 Sheets-Sheet 9

INVENTOR,
F. J. STRAUB,
BY
ATTORNEY,

United States Patent Office 2,737,307
Patented Mar. 6, 1956

2,737,307

MECHANISM TO UNLOAD BLOCKS AND THE LIKE BY TILTING

Francis J. Straub, New Kensington, Pa.

Application July 23, 1952, Serial No. 300,540

4 Claims. (Cl. 214—314)

This invention relates to mechanism for unloading articles especially through tilting.

While the invention is capable of practice in connection with practically any articles, it is especially useful in unloading blocks, bricks or the like from racks on which they have been cured or have otherwise been placed in the course of their manufacture, and for simplification the use of either the word brick or block hereinafter is to be interpreted to mean any and all equivalent articles.

It is aimed to provide a novel means whereby the racks may be tilted to discharge the blocks or bricks therefrom, means to resiliently limit the degree of tilting of the racks, and generally a novel construction facilitating handling and manipulation of the rack in connection with the novel apparatus, with the lifting fork of conventional self-propelled lifting trucks or the equivalent.

A particular object is to provide a novel means whereby the removable pallets which directly support the blocks or bricks will not slide off of tilted racks in unloading as aforesaid although the blocks or bricks will freely unload the moving relatively to and off of the pallets.

One prime object is to incorporate in an unloading mechanism, means whereby the bricks or blocks will be positively loosened with respect to their pallets or the rack through movement of the rack to unloading position, to thereby facilitate unloading especially if the blocks or bricks have adhered to the pallets during curing or otherwise.

A further object is to provide a loosening means of the character referred to which will progressively loosen a plurality of rows or tiers of the blocks or bricks one at a time to enable use of minimum power.

Further, an aim is to provide such a loosening means as one or more levers operable through tilting of the cradle of the apparatus and equipped with parts to successively loosen the blocks or bricks on the pallets at different elevations in their rack.

Another important object is to provide such a loosening means which employs cable or flexible parts therein in association with weight or other biasing means which will yield or function to avoid undue strain or breakage.

The more specific objects and advantages will become apparent from a consideration of the description following taken in connection with the accompanying drawings illustrating several embodiments by way of example.

In said drawings:

Fig. 4 is a rear elevation;

Figure 8:
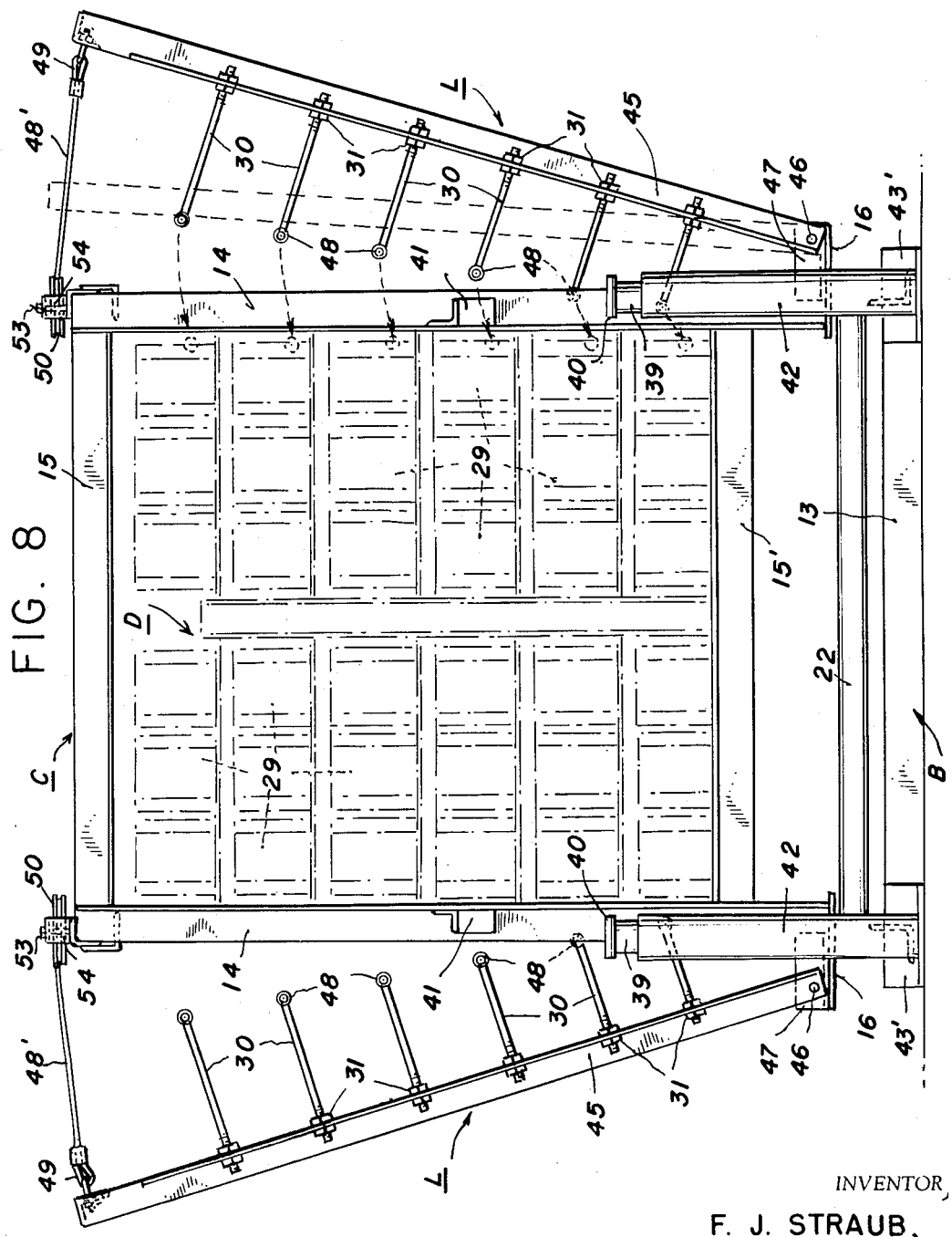
Figure 9:
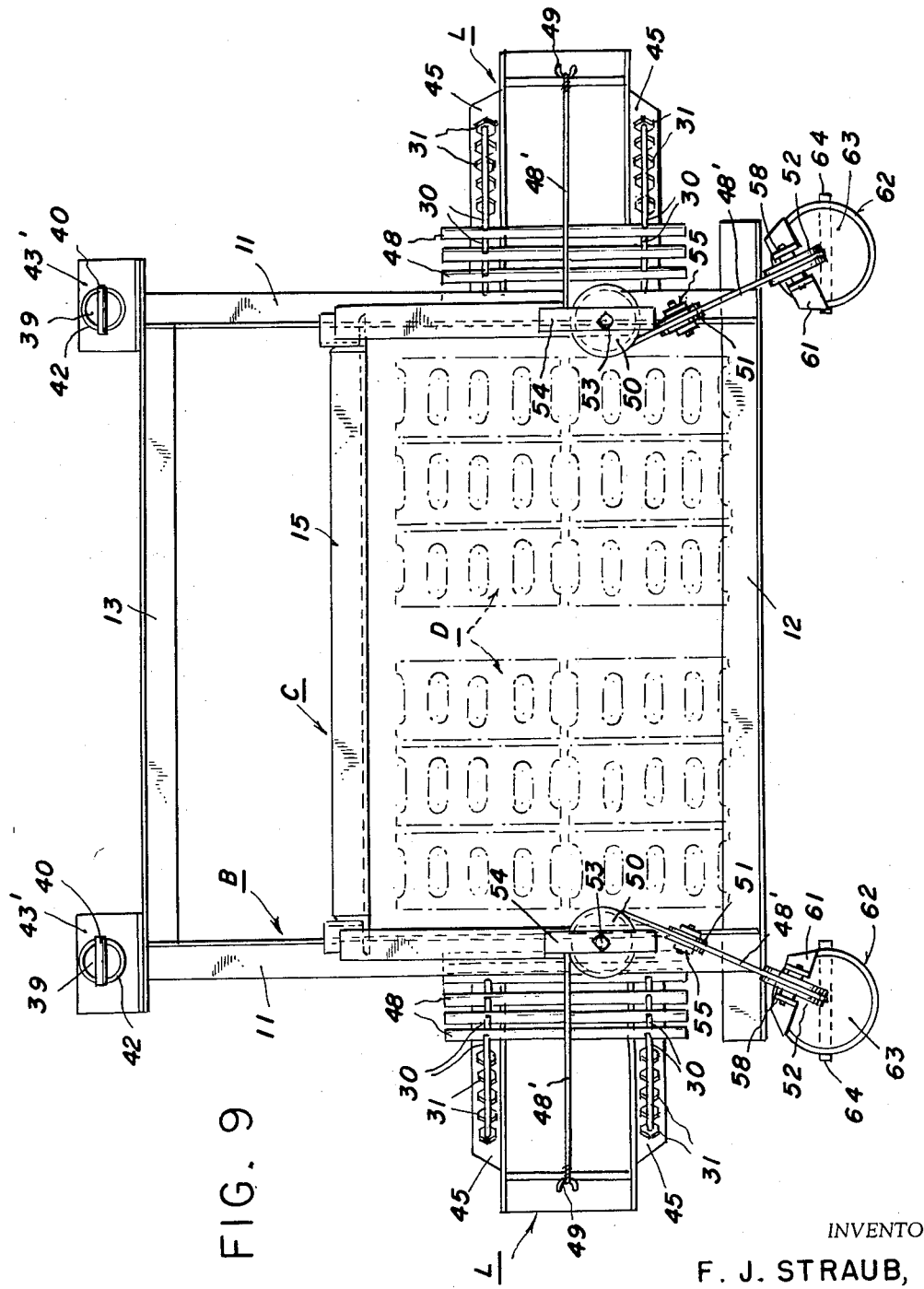
Figure 10:
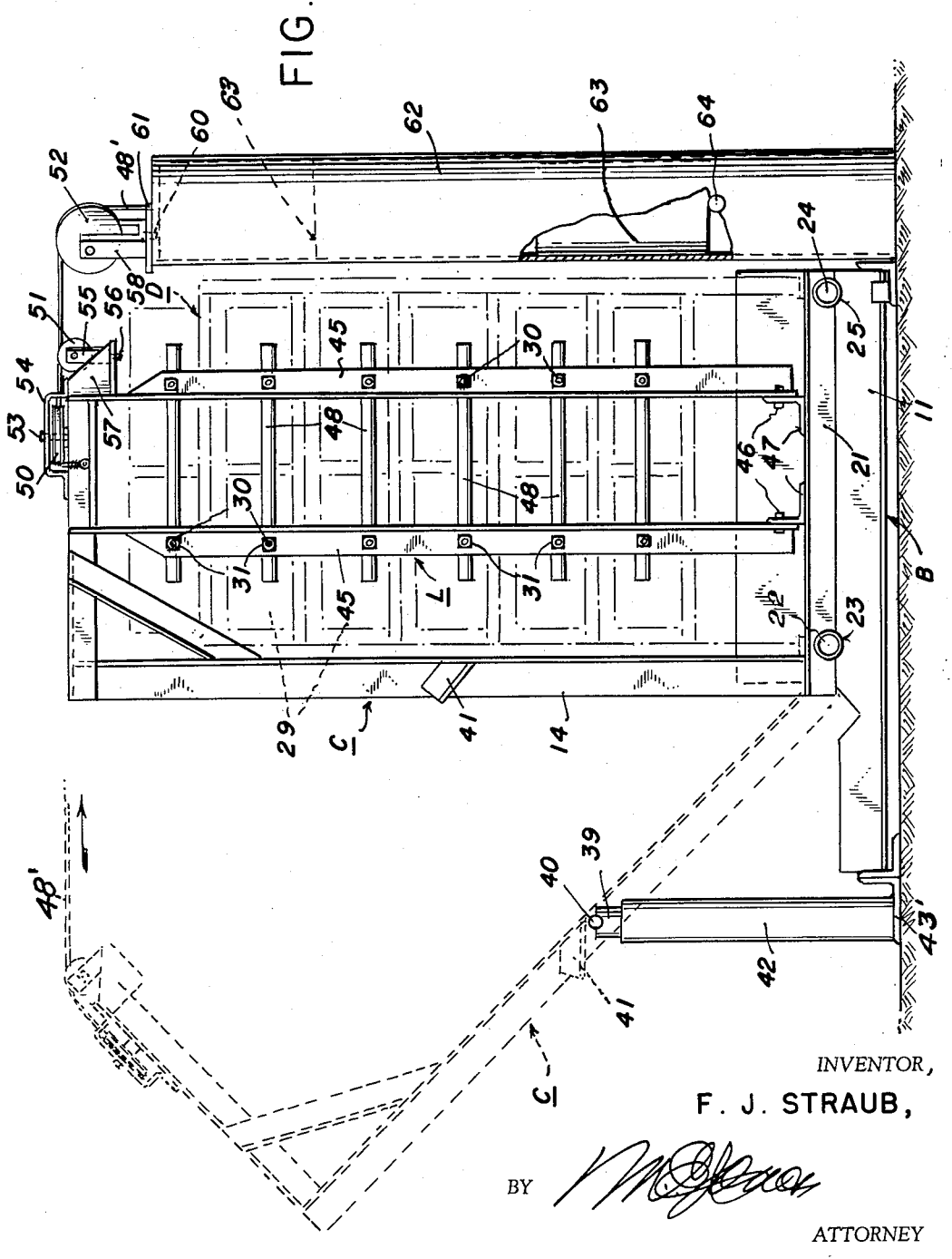
Figure 13:
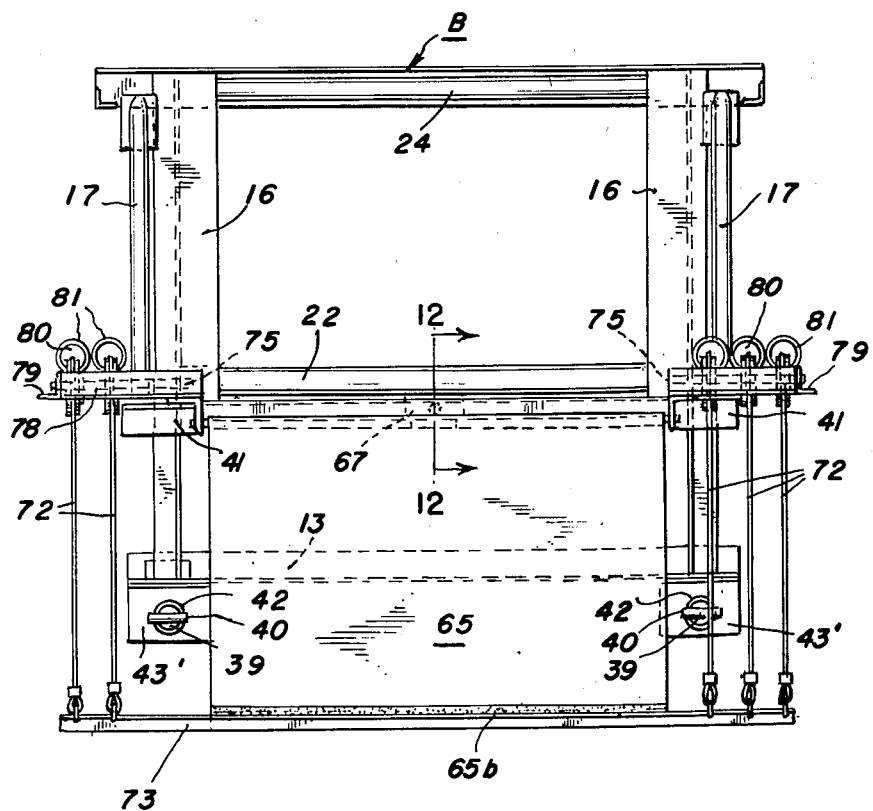

Figs. 5, 6 and 7, respectively, are cross-sections taken on the lines 5—5, 6—6, and 7—7 of Fig. 4;

Fig. 8 is a rear elevation of a second or modified form of the invention;

Fig. 9 is a plan view of such second form;

Fig. 10 is a side elevation of said second form, the tilted or discharge position of the cradle being suggested in dotted lines;

Fig. 11 is a side elevation of a third or further modified form, the shelves being shown in position for receiving blocks and being shown in dotted lines in elevated position;

Fig. 12 is a fragmentary view primarily in section taken on the line 12—12 of Fig. 13;

Fig. 13 is a plan view of the third form; and

Figure 14:
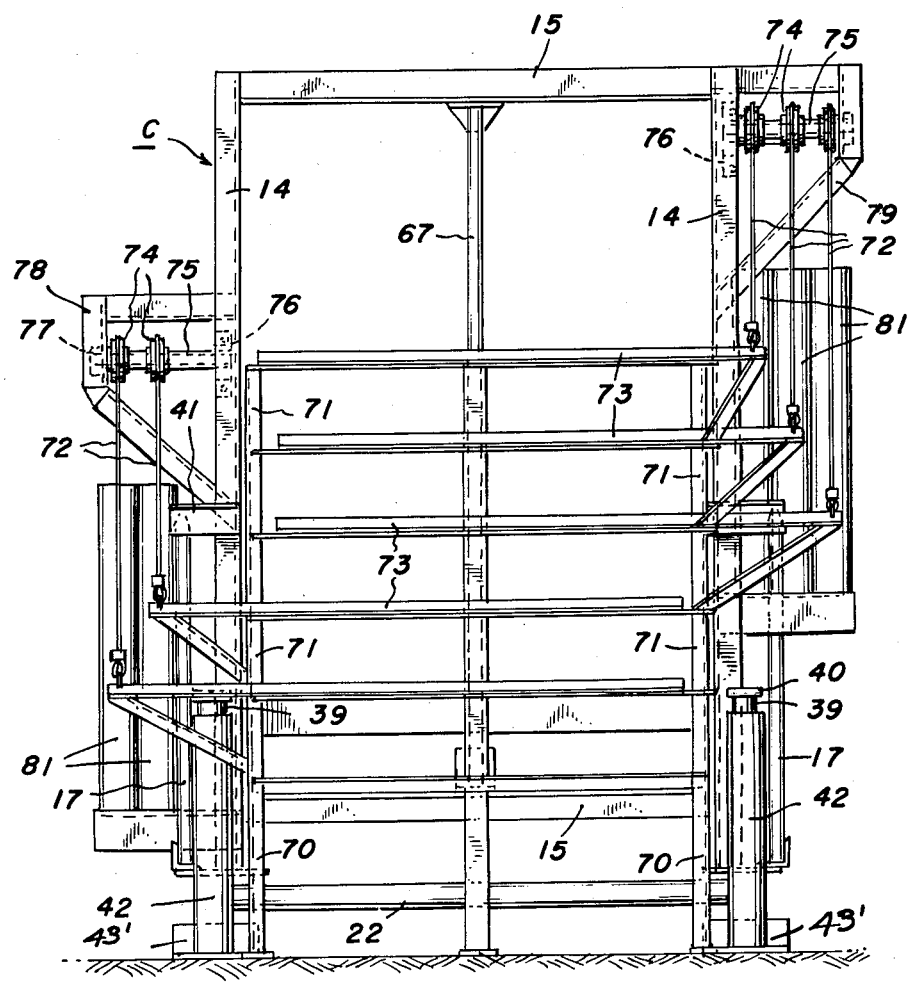

Fig. 14 is a rear elevation of said third form.

Referring specifically to the drawing wherein like reference characters designate like or similar parts and first to the parts common to all forms and figures thereof, B designates a suitably fixed or anchored generally rectangular base shown as having side bar members 11 and front and rear bar members 12 and 13 welded or otherwise secured thereto.

Figures 1, 2:
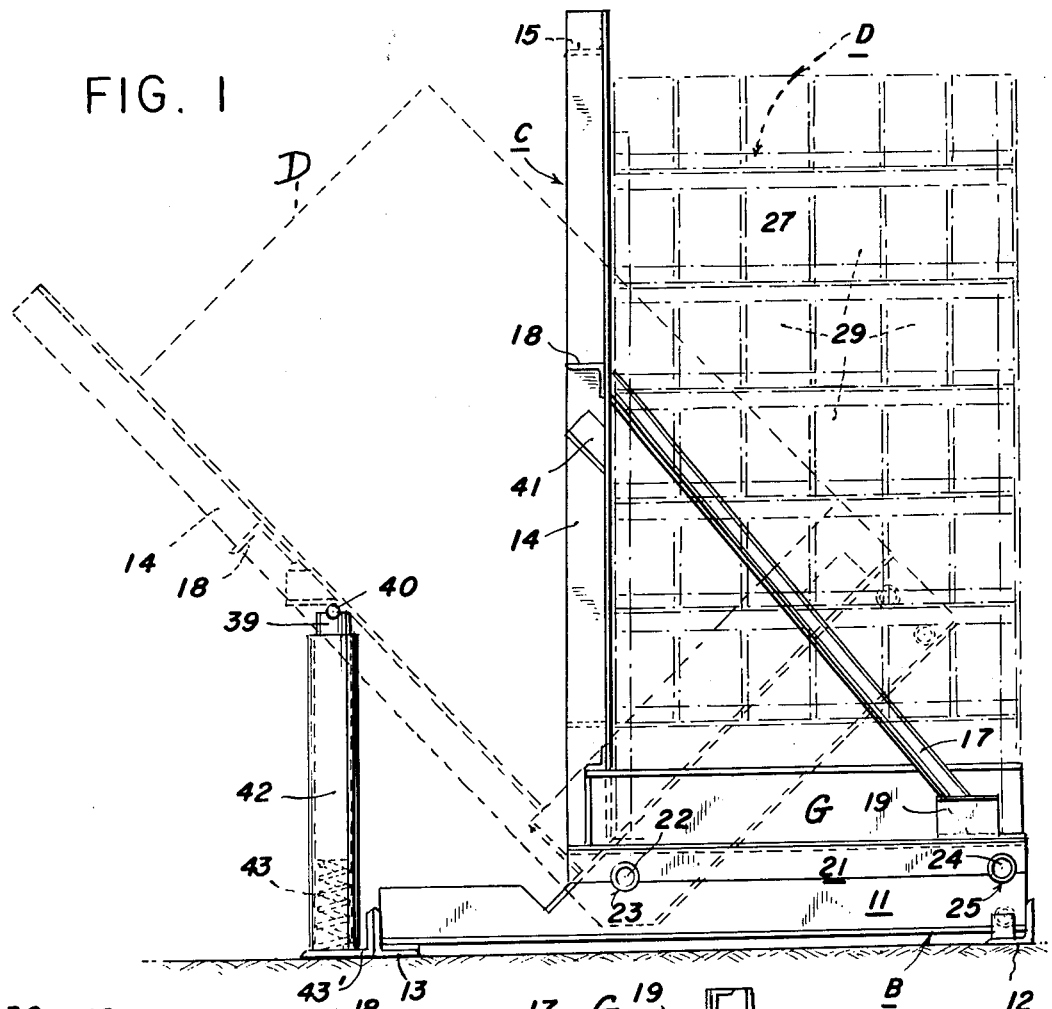
Fig. 1 is a view in side elevation of one form of the invention, the cradle being shown in full lines as having received pallets and blocks, the latter being shown in dotted lines, and the tilted or discharge position of the cradle being suggested in dotted lines.
Fig. 2 is a plan view.
Figure 3:
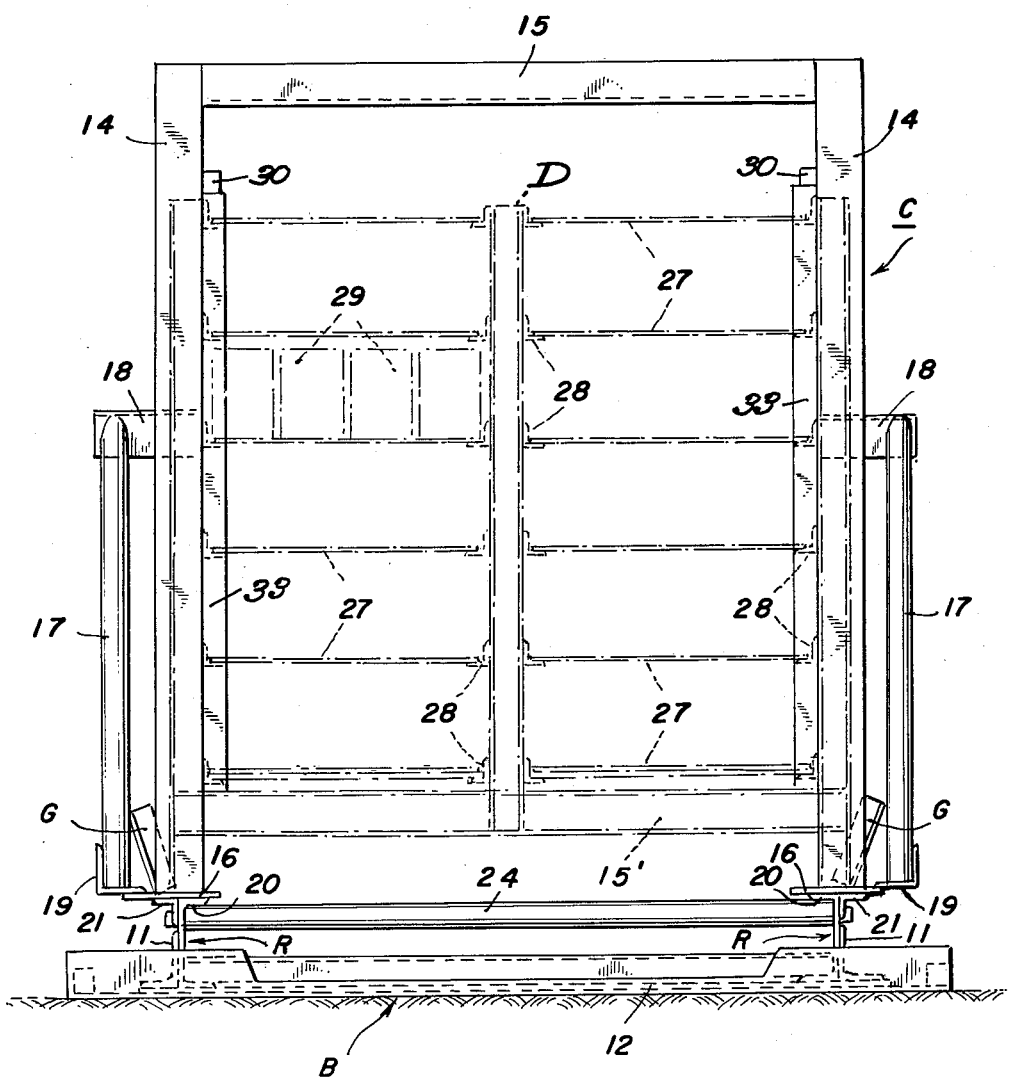
Fig. 3 is a front elevation.

Disposed on said base B to normally occupy a vertical position as in full lines for example in Fig. 1 is a tiltable cradle or frame C. Said cradle C as suggested by the phantom or dot-dash lines D in Figs. 1 and 3 is from time to time loaded with material to be discharged through gravity and sliding movement to the left in Fig. 1 through tilting of cradle C from the full line position to the dotted line position in the same Fig. 1.

Reverting to cradle C it is for example made of suitable structural metal pieces as is also base B, such cradle in side elevation as in Fig. 1 advantageously being of L-shape. Said cradle C has an open wall which may consist of laterally spaced uprights or side members 14 joined by upper and lower cross members 15 and 15'. Said side members 14 at their lower ends are welded or otherwise attached to forwardly extending horizontal rails R which may include plates 16. Diagonal braces 17 are suitably attached by means of laterally offset connections 18 and 19 to said side members 14 and to said side plates 16 adjacent their forward ends. All parts of rails R are welded or otherwise rigidly connected together and in addition to plates 16 preferably include inner channel beams 20 and outer angle members 21 disposed below the same. Adjacent the junction of uprights 14 and rails R, a tubular rod 22 spans and rigidly connects beams 20 and angle members 21, extend outwardly beyond the latter and adjacent their extremities are journaled to base B as in tubular bearings 23 suitably carried by side bar members 11 of the base so that the rod 22 serves as the axis or fulcrum of movement on which to swing the cradle to and from the receiving and discharging positions suggested in Fig. 1.

A rod 24 braces the cradle at the front of the rails R being welded thereto, extending outwardly therefrom, and disposed at an elevation to normally rest in notches 25 in the upper edges of the vertical flanges of side bar members 11.

Returning to consideration of the phantom or dot-dash lines D for example, they represent a conventional skeletonized portable rack as used in brick and block manufacture. Such rack has side members 26 whereby it may rest on the plates 16 for removable disposition and support in the cradle being guided into place therein by inclined plates G. Such rack has removable metal pallets 27 supported by angle irons 28 and as is understood in the art the blocks or bricks 29 after molding are placed on the pallets and then by suitable handling mechanism the pallets individually or otherwise with the blocks or bricks thereon are placed in the rack. When the rack is full of the pallets and blocks or bricks, the full rack is handled as a unit, being placed in a curing oven for example. After curing the full rack of cured blocks or bricks is moved as a unit from the curing oven and disposed in the cradle C as suggested by the dot-dash lines so that the cradle may be manipulated to rapidly unload or discharge the blocks or bricks through gravity and sliding upon tilting the cradle upwardly and rearwardly on its fulcrum 22.

Said material or racks D is handled or transported as a unit usually by a mobile tractor or truck having a fork whose tines engage removably beneath and support rigid parts of the rack, the tractor or truck being operable to readily engage and disengage its tines with or from the rack.

Also, those same tines may be the means for tilting the cradle block and filled rack as a unit from the full line position to the dotted line position in Fig. 1. In such event, the forward ends of the tines are disposed beneath rod 24 and then elevated to effect the tilting of axis 22.

Ordinarily the pallets 27 would be free to slide off of the rack and be discharged with blocks or bricks 29 but the invention provides means to prevent this so that a rack with empty pallets may be maintained assembled and with maximum facility and at minimum expense removed from the cradle and returned as a unit for reuse. Thus to prevent the pallets 27 sliding from the rack with the bricks, one of any selected number and disposition of pallet retainers 30, 31 and 32 may be removably carried by the cradle. Retainers 30 are carried by angles 33 removably bolted at 34 to uprights 14. Central retainer 31 consists of three tubes welded to end brackets 35 bolted at 36 to cross members 15 and 15' and intermediate retainers 31 have brackets 37 welded thereto and in turn removably bolted at 38 to cross members 15 and 15'. The particular construction of each will determine which of the retainers are used. For example with the construction of rack and pallets shown, retainers 30 and 32 may be used, or in lieu of them, retainers 31 alone may be employed.

In order to limit movement of the cradle to inclined or discharge position, cushion and support it in that position, a pair of abutments 39 are provided having cap rests 40 engageable by shoulders 41 carried by cradle C. Abutments 39 are slidably mounted on cushioning springs 43 in cylinders 42 rigidly anchored at 43' to base B.

In operation, the cradle C as in Figs. 1 and 3 is adapted to be loaded as with a rack D containing removable pallets 27 with cured blocks 29 thereon. Such rack, pallets and blocks are adapted to be transported or moved as a unit as by the engagement of the rack from below with the fork or tines of a lifting or elevating tractor or truck. After the rack, pallets and blocks are positioned, the fork or tines is withdrawn, preferably first with incidental lowering. They are open in order to unload the blocks 29 from the shelves 27. The cradle C is tilted on the axis 22 as shown in Fig. 1 with the shoulders 41 resting upon the cap piece 40. The pallets 27 in such tilted position, although removable, cannot slide out of the rack since they abut any or all of the stops or retainers detailed in Figs. 5, 6 and 7, which generally are designated 30, 31, and 32. However, the blocks will slide relatively to the pallets and off of the same, to the left, through the open wall or frame 14 on to the ground into suitable receptacles onto shelves, or otherwise, as is deemed most expedient under the circumstances.

With the aforesaid construction or equivalent unloader, I may provide means to positively loosen blocks or bricks 29 from the pallets 27 functioning through the tilting of the cradle C to discharge position, one such means being shown in Figs. 8, 9 and 10, and is employed because the ceramic, concrete or like nature of the bricks or blocks 27 often adheres or bonds to the pallets during curing. The structure in said Figures 8 to 10 generally conforms to that of Figs. 1 to 7 and hence the same reference characters apply and have been followed. Carried by cradle C at each side thereof is a block-loosening arm or lever L each consisting for example of parallel stiles 45 pivoted at 46 on a horizontal axis to brackets 47 rigid on cradle C. Loosening rods or heads 48, one for each row or tier of blocks 29 is fastened to the levers at the stiles thereof by means of bolts 30 and nuts 31, the levers L normally being angularly disposed and the heads 48 of the levers in upward direction being progressively increasing distances from the planes of the respective levers and the rows of blocks to be engaged by the heads so that through swinging of the levers toward the cradle and racks, the lowermost row of blocks 29 will be engaged and loosened first and then the remaining rows will be engaged and loosened, all rows thus being loosened one at a time and successively in upward direction, and thus by the application of minimum power as the cradle is tilted.

In order to swing said levers, cables 48' are attached at 49 to the levers adjacent their upper ends and are then trained over guide pulleys 50, 51 and 52. Said pulleys 50 are journaled at 53 in brackets 54 fastened to the top of cradle C. Said pulleys 51 and 52 permit automatic adjustment to changing angles of the cable during tilting of the cradle, the former being carried by a yoke 55 swivelled at 55 in a bracket 57 on the cradle C, and the latter being journalled in a yoke 58 swivelled at 60 to a mounting bracket 61 fastened to a stationary pipe or tube 62. The lower end of cables 48' are attached to slidable and turnable counterweights 63 in the pipes 62 which normally rest on diametric rods 64 mounted on the pipes. Said cables 48' are of such length that they will cause levers L to swing toward the cradle and rack through tilting of the cradle but such cables will not raise the counterweights 63 until after the levers 48 have completed swinging or block-loosening movements, this being necessary since further tilting of the cradle would break the cables. The weight of the counterweights 63 is determined by the force necessary to break the bricks or blocks loose from the pallets.

In the modified form of Figs. 11 to 14, the cradle C is generally constructed and operates as in the preceding forms. It is equipped with shelves 65 and 65a which receive the bricks as they are pushed from the pallets 27 of the rack D positioned in such cradle for unloading. Said shelves 65 and 65a in their operative positions match the levels of the pallets 27 of the rack D. Each shelf 65 and 65a is fastened to a hinge or pivot rod 66 whose opposite ends are pivoted in flanges of the uprights 14. A vertical intermediate or center post 67 is secured to the cross members 15 and 15' and it supports and forms central bearings 69 for rods 66. Each shelf 65 and 65a at its rear end portion, is provided with a removable bumper 65b against which received brick abut and which bumpers may be sections of rubber, rubber hose or other resilient or cushioning material. Shelf 65a is lowermost and is held horizontally as in Fig. 11 by end supports 70 which are detachable or displaceable to permit tilting of the cradle C. The pivotal mounting of shelf 65a permit the latter to yield, if necessary, rather than be broken off as it engages the ground incident to tilting of the cradle C.

Each shelf 65 at its two corners at the discharge end carries depending feet 71 which are adapted to rest on the shelf next beneath it to hold the shelves horizontal. In addition to the shelves 65 and 65a being capable of unloading brick through tilting of the cradle, each shelf may be unloaded individually and manually or by power and successively from the top shelf down. However, as each shelf is unloaded, it is adapted to raise automatically from the horizontal or full line position in Fig. 11 to the dotted line position in the same figure. This will give maximum accessibility to the blocks and greatly remove hazards in the path of movement of the arms, hands or other parts of the bodies of the workmen engaged in the unloading operation.

To effect the aforesaid automatic raising of the shelves 65 after unloading, each shelf has a flexible cable 72 fastened to a bar 73 welded or otherwise secured to the shelf. Said cables are trained over pulleys 74 journalled on shafts 75 mounted in bearings 76 fastened to uprights 14 and in bearings mounted in brackets 78 and 79 fastened to the different uprights 14. The other ends of said cables 22 are fastened to counterweights 80 which are vertically slidable in tubes or wells 81 suitably secured to said uprights 14.

I claim as my invention:

1. Unloading mechanism having a cradle to support a rack having an upright row of pallets with blocks thereon, means mounting said cradle for tilting to discharge said blocks from said rack, means on the cradle operable to prevent sliding of said pallets with said rack and blocks during said tilting movement, and means carried by the cradle operable on a different axis from that of tilting movement of the cradle and through tilting movement of the cradle to successively engage the blocks of the different rows and impart pushing movement to the blocks relatively to the pallets.

2. Unloading mechanism having a cradle to support different rows of blocks, means mounting said cradle for tilting to discharge said blocks, a lever pivoted to said cradle on a different axis from that of the said means, block dislodging means on said lever, a cable operatively attached to said lever for drawing through said tilting of the lever, counterbalancing means for said cable and lever, and said lever having heads progressively disposed at increasing distances laterally of the cradle from one end of the lever toward the other for successively engaging the blocks of different rows.

3. Unloading mechanism having a cradle to support blocks, means mounting said cradle for tilting to discharge said blocks, a lever pivoted to said cradle on an axis at right-angles to the axis of tilting, block dislodging means on said lever, a cable operatively attached to said lever to be drawn thereby through tilting of the cradle, a tube, a weight attached to said cable disposed in the tube, guide pulleys on said cradle and tube for said cable, and a swivel mounting for the pulley on said tube.

4. Unloading mechanism having a cradle to support blocks at different elevations, a base mounting said cradle for tilting to discharge said blocks, levers pivoted on axes at a right-angle to the axis of tilting to opposite sides of said cradle, dislodging means carried by said levers, cable means connected to the levers operable through said tilting movement of the cradle to cause said dislodging means to impart dislodging movement to said blocks successively at the different elevations, counterbalancing means for the cable means, tubes on said base for said counterbalancing means, and guide pulleys for said cables mounted on said cradle and tubes.

References Cited in the file of this patent

UNITED STATES PATENTS

| | | |
|---|---|---|
| 1,253,640 | Spear | Jan. 15, 1918 |
| 1,473,996 | McGarry | Nov. 3, 1923 |
| 1,518,278 | Schroeder et al. | Dec. 9, 1924 |
| 1,556,438 | Hanson et al. | Oct. 6, 1925 |
| 1,759,005 | Fuller | May 20, 1930 |
| 1,779,210 | Davis | Oct. 21, 1930 |
| 1,887,120 | Daly | Nov. 8, 1932 |
| 2,376,457 | Skoog | May 22, 1945 |
| 2,603,366 | Adams | July 15, 1952 |
| 2,636,625 | Pries | Apr. 28, 1953 |
| 2,661,100 | Ashford | Dec. 1, 1953 |